(No Model.)
E. L. LLOYD.
BOTTLE STOPPER.
No. 474,642. Patented May 10, 1892.
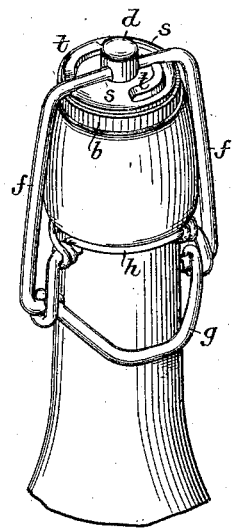
FIG. 1.
FIG. 2.
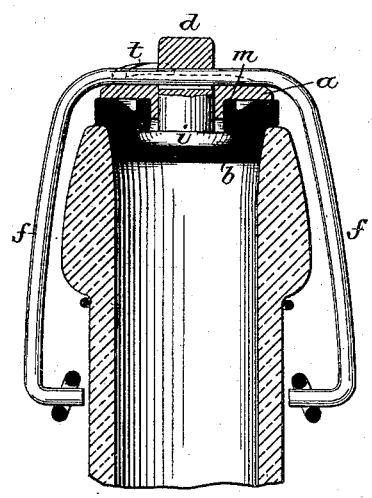
FIG. 3.
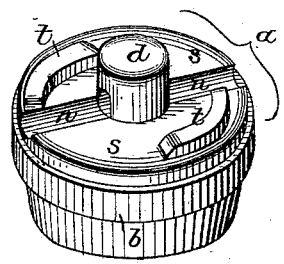
Witnesses:
R. Schlicher
A. V. Groupe
Inventor:
Edwin L. Lloyd
by his Attorneys
Howson & Howson

UNITED STATES PATENT OFFICE.

EDWIN L. LLOYD, OF PHILADELPHIA, PENNSYLVANIA.

BOTTLE-STOPPER.

SPECIFICATION forming part of Letters Patent No. 474,642, dated May 10, 1892.

Application filed February 5, 1892. Serial No. 420,422. (No model.)

*To all whom it may concern:*

Be it known that I, EDWIN L. LLOYD, a citizen of the United States, and a resident of Philadelphia, Pennsylvania, have invented certain Improvements in Bottle-Stoppers, of which the following is a specification.

The object of my invention is to so construct a bottle-stopper that varying degrees of pressure may be exerted upon the rubber washer in order to compensate for wear of the same, this result being attained without sacrificing the metallic bearing for the bail or yoke both on the upward and downward movements of the stopper.

In the accompanying drawings, Figure 1 is a perspective view of a bottle-stopper and fastening constructed in accordance with my invention. Fig. 2 is a sectional view of the same on a somewhat larger scale, and Fig. 3 is a perspective view of the stopper without the fastening devices.

The stopper comprises the usual cap $a$ and rubber washer $b$, applied to the under side of the same, and from the top of the cap projects a stem or post $d$, having a transverse opening for the reception of the bail or yoke $f$ of the tightener, the lower ends of this bail or yoke being acted upon by the tightening-lever $g$, which is hung in eyes on the neck-wire $h$, as usual. In ordinary stoppers of this class the stem or post $d$ projects upward from the back of the cap $a$ and is integral with said cap. Hence on the depression of the lever $g$ the cap $a$ is always drawn down to the same extent, and although a tight joint may be formed when the washer $b$ is new leakage is likely to occur when said washer becomes worn. In carrying out my invention, therefore, I make the stem or post $d$ separate from the cap $a$ and adapt it to a central opening in said cap, in which it is free to move vertically, the lower end of the stem having a head or button $i$, between which and the bottom of the cap is confined the central portion or tube $m$ of the washer, the elasticity of which consequently tends to press the stem $d$ downward to its lowest position.

The cap $a$ is free to turn on the stem $d$. Hence by providing said cap with bearings in different horizontal planes for the yoke or bail $f$ the degree of pressure imparted to the washer $b$ can be regulated as desired, so as to compensate for any extent of wear of said washer.

In the present instance the cap has a transverse groove $n$, and on each side of the same two flat bearing-surfaces $s\ t$, one somewhat higher than the other, the corresponding bearings being diagonally disposed, as shown in Fig. 3. When the yoke $f$ is resting in the groove, therefore, the least amount of pressure is exerted upon the washer $b$ when the cap is drawn down by the yoke $f$, but by turning the cap so that the yoke bears upon the surfaces $s$ a greater degree of pressure will be imparted to the washer when the cap is drawn down, and by turning the cap until the yoke bears upon the surfaces $t$ a still greater degree of compression is provided for. This result, moreover, is gained without sacrificing the rigid bearing of the yoke against a metallic stem on the upward movement, and the successive adjustments of the cap effect a compression of the central portion $m$ of the washer, instead of a stretching of the same, thus overcoming objections to stoppers in which the central portion of the elastic washer projects through an opening in the cap $a$ for the reception of the yoke $f$.

Having thus described my invention, I claim and desire to secure by Letters Patent—

1. A bottle-stopper in which are combined the fastening-yoke, the tightening-lever therefor, the cap, its washer, and a stem free to turn and slide in the cap and constructed for the reception of the fastening-yoke, said stem having at its lower end a head or button, between which and the base of the cap a portion of the washer is confined, substantially as specified.

2. A bottle-stopper in which are combined the fastening-yoke, the tightening-lever therefor, a cap having a transverse groove and flat ledges in different horizontal planes on each side of the same, a washer, and a central stem free to slide and turn in the cap and constructed for the reception of the fastening-yoke, said stem having at its lower end a head or button, between which and the under side of the cap a portion of the washer is confined, substantially as specified.

In testimony whereof I have signed my name to this specification in the presence of two subscribing witnesses.

EDWIN L. LLOYD.

Witnesses:
EUGENE ELTERICH,
HARRY SMITH.